United States Patent [19]

Tsou

[11] 4,186,117
[45] Jan. 29, 1980

[54] CATHODIC ELECTRODEPOSITION COATING COMPOSITIONS CONTAINING DIELS-ALDER ADDUCTS

[75] Inventor: Ivan H. Tsou, Bloomfield Hills, Mich.

[73] Assignee: Grow Chemical Corp., Troy, Mich.

[21] Appl. No.: 948,397

[22] Filed: Oct. 4, 1978

Related U.S. Application Data

[62] Division of Ser. No. 859,296, Dec. 12, 1977, Pat. No. 4,148,704.

[51] Int. Cl.$^2$ .......................... C09D 3/58; C09D 5/40
[52] U.S. Cl. ........................... 260/23 AR; 260/18 EP; 260/23 EP
[58] Field of Search ............... 204/181 C; 260/18 EP, 260/23 AR, 23 EP

[56] References Cited

U.S. PATENT DOCUMENTS

| | | | |
|---|---|---|---|
| 3,799,854 | 3/1974 | Jerabek | 204/181 C |
| 4,136,070 | 1/1979 | Hazan | 260/23 AR |

*Primary Examiner*—Ronald W. Griffin
*Attorney, Agent, or Firm*—Burton, Parker & Schramm

[57] ABSTRACT

Described herein is an organic coating composition particularly useful in cathodic electrodeposition comprising a dispersion, solution or suspension of a coating composition characterized by (a) a reaction product of a conjugated fatty acid ester and an acrylic containing monomer, preferably containing oxirane rings; and (b) Formula A within the molecule, being the reaction product of reacting an oxirane ring and an amine; wherein Formula A is:

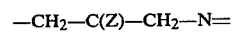

wherein Z is hydrogen, hydroxyl, alkoxy of 1 to 6 carbon atoms; acyloxy of from 1 to 6 carbon atoms; (=O, as in a ketone),

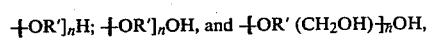

wherein R' is a saturated alkylene group of from 2 to 4 carbon atoms and n is a number from 1 to 6.

Also described is a method of electrodepositing coating compositions containing said adducts onto a cathode.

7 Claims, No Drawings

CATHODIC ELECTRODEPOSITION COATING COMPOSITIONS CONTAINING DIELS-ALDER ADDUCTS

This is a division, of application Ser. No. 859,296, filed Dec. 12, 1977, now U.S. Pat. No. 4,148,704, issued Apr. 10, 1979.

BACKGROUND OF THE INVENTION

It has become commercially of significance to employ cathodic electrodeposition coating compositions for improved corrosion resistance can be obtained employing said composition U.S. Pat. No. 4,001,101 teaches the electrodeposition of epoxy compositions which contain boron in the form of boric acid and like compounds. U.S. Pat. No. 4,001,156 teaches a method of producing epoxy group containing quaternary ammonium salt containing resins.

SUMMARY OF THE INVENTION

An object of the present invention is coating compositions of improved corrosion resistance particularly when employed in the cathodic electrodeposition coating process. Additionally the compositions when cured have improved weather durability, particularly on exposure to sunlight and ultraviolet light. There is an improvement over prior art compositions in chaulking resistance, weather exposure and lower bake temperatures.

The coating compositions of the present invention are prepared by reacting through the double bonds of the reactants an acrylic material containing an oxirane ring with a conjugated fatty acid ester. Without being bound to any particular theory, it is believed that this reaction is a Diels-Alder adduct reaction. The product of that reaction is in turn reacted with an amine to introduce the nitrogen moiety into the molecule.

DESCRIPTION OF PREFERRED EMBODIMENTS

In the preparation of the products to be used in the process of the present invention, the first step is the Diels-Alder reaction between the conjugated fatty acid esters and monomeric materials containing oxirane ring. The reaction can be said to proceed along the following lines:

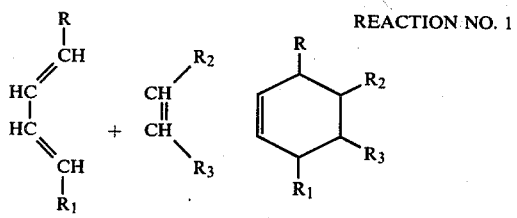

REACTION NO. 1 wherein

R and $R_1$ are residue of fatty acid ester molecule;

$R_2$ and $R_3$ are residue of acrylic containing monomer.

Catalysts may be used to accelerate the adduct reaction such as peroxides.

Reference may be made to applicant's concurrently filed case U.S. Pat. No. 859,295, filed Dec. 12, 1977, CATHODIC ELECTRODEPOSITION COMPOSITIONS EMPLOYING FATTY ACID DERIVATIVES.

The reactants that are employed for the conjugated fatty acid component may be exemplified by the following materials: alkyl esters wherein the alkyl group ranges from 1 to 12 carbon atoms and the fatty acid that may be employed are long chain fatty acids having from 8 to 24 carbon atoms. A preferred fatty acid is one having high conjugated diene concentration such as products available under the name Pamolyn (trademark of Hercules) especially Pamolyn 380 which has a high concentration of unsaturation at positions 9 and 11 of $C_{18}$ fatty acid. Suitable fatty acids are caprylic, capric, lauric, myristic, palmitic palmitoleic, stearic, oleic, ricinoleic, linoleic, linolenic, eleostearic, licanic, arachidic, arachidonic, behenic, clupanodonic, lignoceric, nisinic, and the like. A preferred alcohol is an alkanol of from 1 to 8 carbon atoms, such as methanol, butanol, hexanol, and the like.

It is to be appreciated that the esters of the conjugated fatty acids may be employed by using the reaction products resulting from reacting conjugated fatty acids with polyols.

Exemplary among the polyols are the following: ethylene glycol, propylene glycol, butylene glycol, glycerol, trimethylolpropane, hexanetriol, pentaerythritol, neopentylglycol, trimethylolethane and the like. In general the amount of alcohol added is sufficient to react all of the fatty acid so that the number of equivalents of hydroxyl groups exceeds the number of equivalents of carboxyl groups in a range of 1:1–1:1.3—carboxyl:hydroxyl groups.

The monomeric reactants that may be employed for the Diels-Alder reaction may be exemplified by the following materials: acrylic or methacrylic materials alone or together with other monomeric materials.

By "acrylic" is meant a material containing therein the monomer of the formula:

$$CH_2=C(B) C(O)—$$

wherein B=hydrogen, methyl or ethyl.

Exemplary acrylic materials that may be employed are acrylic or methacrylic acids, the alkylesters or hydroxyalkylesters thereof where the alkyl group has from one to 18 carbon atoms, such as isobornyl acrylate, methyl(meth)acrylate, butyl(meth)acrylate, 2-ethylhexyl(meth)acrylate, steryl acrylate, steryl methacrylate, and the like, acrylamides, methacrylamides, and the like. It is to be appreciated that other copolymerizable monomers may also be reacted with the acrylic material. Exemplary ethylenically unsaturated materials are styrene, vinyl toluene; 3,5-dimethyl styrene, p-tert-butyl styrene, alpha methyl styrene, and the like, unsaturated dicarboxylic acids or anhydrides and the alkylesters thereof from 1 to 18 carbon atoms (such as maleic anhydride, fumaric acid and the like.

A preferred class of acrylic reactants are those that contain the acrylic moiety together with an oxirane ring in the same molecule, such as glycidyl acrylate and methacrylate and other similar type materials such as those taught in U.S. Pat. No. 3,773,855, which is hereby incorporated by reference, such as acrylic and methacrylic esters of the monoglycidyl ether of sulfonyl bisphenol, the monoglycidyl ether of a $C_1$ to $C_{10}$ alkylene bisphenol, the monoglycidyl ether of oxybisphenol, the monoglycidyl ether of thiobisphenol, the monoglycidyl ether of aminobisphenol and the monoglycidyl ether of $\alpha,\alpha$-bis(p-hydroxyphenyl) tolylethane; the acrylic and methacrylic esters of 3-oxy-6,7-epoxyheptanol, 3-aza-6,7-epoxyheptanol, or 3-thia-6,7-epoxyheptanol; the reaction products of one mole of acrylic or methacrylic acid with one mole of polyphenylenesulfide diglicidyl ether, polyphenyleneamine diglicidyl ether, or polyphenyleneoxide diglycidyl ether; the reaction products of one mole of acrylic acid or methacrylic acid with one mole of the polycondensation product of epichlorohydrin with sulfonyl bis(phenylmercaptan) or sulfonyl bisphenol; the reaction products of one mole of acrylic acid or methacrylic acid with one mole of the polycondensation product of epichlorohydrin with $\alpha,\alpha$-bis(p-hydroxyphenyl) tolylenthane or $\alpha,\alpha$-bis(p-thiophenyl) tolylethane; the acrylic and methacrylic esters of poly ($C_1$-$C_4$ alkyleneoxide glycol) monoglycidyl ether; and the like.

The reaction parameters for Reaction No. 1 are to produce the reaction in the liquid state with or without a presence of an organic solvent which is non-reactive with the reactants at a temperature ranging from about 150° C. to 250° C.

The second step in the reaction scheme is to react the Diels-Alder adduct which contains an oxirane ring with an amine containing an active hydrogen in order to open the oxirane ring present in the adduct. The reaction scheme can be shown as follows:

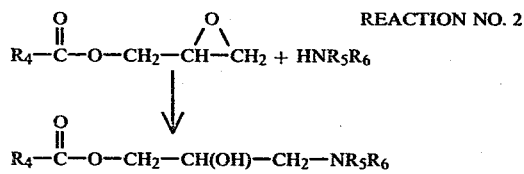

REACTION NO. 2 wherein $R_4$ is the residue of the Diels-Alder adduct; and $HNR_5R_6$ represents the amine reactants.

The product shown in Reaction No. 2 contains the moiety: $-CH_2-CH(OH)-CH_2-N>$ which is the expected result of reacting the secondary amine with the oxirane ring. For further modification of the polymer the hydroxyl group may be converted:

(a) to a ketone by reacting the product shown in reaction No. 2 with an oxidizing agent, such as permanganate, a chromic acid and the like, or (b) to a hydrogen atom by means of a Grignard type reaction sugh as by reacting the product shown in reaction No. 2 with HBr to convert the hydroxyl group beta to the nitrogen atom to the bromide form; then converting the bromide to a Grignard reagent by reaction with magnesium and then reacting that product with an alkanol such as methanol or propanol; or (c) to the alkoxy group by reaction with an alkyl halide; or (d) to the acyloxy form by esterification with a carboxylic acid; or (e) to the product containing $-(-OR'-)_{\overline{n}}H$ by reaction with an alkylene oxide of from two to four carbon atoms; or (f) to $-(-OR'(CH_2OH))_{\overline{n}}OH$ by reacting with epihalohydrin and the like and then converting to the hydroxyl form by hydrolysis; or (g) to $-(-OR'-)_{\overline{n}}OH$ by reaction with a glycol, and the like.

Therefore it can be said that the polymer contains Formula A which is of the structure:

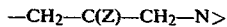

wherein Z is independently selected from the group consisting of hydrogen, hydroxyl, alkyl ether or acyloxy wherein the alkyl and acyl group have from 1 to 6 carbon atoms; (=O, as in a ketone, $-(-OR'-)_{\overline{n}}H$; $-(-OR'-)_{\overline{n}}OH$; and $-(-OR'(CH_2OH))_{\overline{n}}OH$; wherein R' is a saturated alkylene group of from 2 to 4 carbon atoms and n is a number of from 1 to 6.

Exemplary amines that may be used in Reaction No. 2 are those amines that contain a replaceable hydrogen, such as primary or secondary amines such as mono- or dialkylamine, mono- or di-alkanol amines and polyamines such as polyalkylene polyamines, etc. Useful amines are mono- or di-alkylamines having about 1 to 18 carbon atoms, such as propylamine, butylamine, diethylamine, dipropylamine, etc. Examples of mono- or di-alkanol monoamines are ethanolamine, propanolamine, diethanolamine, dipropanolamine, etc. Useful examples of other monoamines are piperidine, cyclohexylamine, pyrrolidine, morpholine, etc. Examples of polyamines are ethylenediamine, hexamethylenediamine, diethylenetriamine, triethylenetetramine, tetraethylenepentamine, propylenediamine, dipropylenetriamine, butylenediamine, N-aminoethanolamine, monoethylethylenediamine, diethylaminopropylamine, hydroxyethylaminopropylamine, monomethylaminopropylamine, piperazine, N-methylpiperazine, N-aminoethylpiperazine, etc. Particularly preferrable are aliphatic mono- or polyamines having one secondary amino group, such as diethylamine, diethanolamine, diethylenetriamine, monoethylethylenediamine, hydroxyethylaminopropylamine, etc. According to this invention, an aromatic amine can be used in combination with the aliphatic or alicyclic amine in such amount that the reaction product of epoxy resin and basic amine, when neutralized with acid, will still remain dispersible in water. Examples of useful aromatic amines are aniline, N-methylaniline, toluidine, benzylamine, m-xylylenediamine, m-phenylenediamine, 4,4'-diaminodiphenylmethane, etc. Use of such aromatic amine achieves the effect of increasing resistances to water and to corrosion of the coating film.

Of the above enumerated amines, diethanol amine is the most preferred.

The conditions for Reaction No. 2 are with or without an organic solvent that is non-reactive with each of the reactants and the products at a temperature ranging from 100° C. to 150° C. for a period of time ranging from about 1 to 3 hours. In general, one is interested in obtaining a product having all oxirane rings reacted.

It should also be appreciated that reaction sequences 1 and 2 may be reversed whereby the amine is reacted first with the oxirane rings and then the remaining rings are reacted with the fatty acid. Care must be taken in this reaction sequence to prevent gellation due to the presence of the tertiary amine which is the reaction product between the hydrogen containing amine and the oxirane ring. The tertiary amines promotes the reaction between an oxirane ring and the hydroxyl group which may be present in the polymer reactants as well as the reaction products if the amine contains a hydroxyl group thereon.

There are a number of other configurations of the conjugated fatty acid ester. The fatty acid may be reacted with a polyol as mentioned above. The fatty acid may also be reacted with glycidyl containing materials prior to reaction sequence No. 1, including glycidyl acrylate or methacrylate. Other epoxy or glycidyl containing materials are mono- or polyepoxides, preferrably a polyepoxide having an epoxy equivalent greater than 1, such as polyglycidyl ethers of polyphenols, such as bisphenol A. These can be prepared by etherification of a polyphenol with epichlorohydrin in the presence of alkali.

Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl) 2,2-propane and the like. There can also be used polyglycidyl esters of polycarboxylic acids, which are produced by the reaction of epichlorohydrin or similar epoxy compounds with an aliphatic or aromatic polycarboxylic acid such as oxalic acid, succinic acid, glutaric acid, terephthalic acid, 2,6-naphthylene dicarboxylic acid, dimerized linolenic acid and the like. Examples are glycidyl adipate and glycidyl phthalate. Also useful are polyepoxides derived from the epoxidation of an olefinically unsaturated alicyclic compound. Included are diepoxides comprising in part one or more monoepoxides. These polyepoxides are non-phenolic and are obtained by the epoxidation of alicyclic olefins; for example, by oxygen and selected metal catalysts, by perbenzoic acids, by acetaldehyde monoperacetate, or by peracetic acid, and/or hydrogen peroxide. Among such polyepoxides are the epoxy alicyclic ethers and esters which are well known in the art.

A particularly preferred class of products that may be used in the present case is the reaction product of reacting a fatty acid, conjugated or not conjugated, with compounds containing nitrogen heterocyclic rings of 5 or 6 members, said compounds also containing one or more epoxy rings. The reaction product can be characterized as an epoxy fatty acid ester.

The nitrogen heterocyclic materials are generally available in the trade and have been described in a number of patents as:

U.S. Pat. No. 3,391,097—EPOXY RESINS FROM 1,1'-METHYLENE BIS(5-SUBSTITUTED HYDANTOIN)
U.S. Pat. No. 3,814,775—3-GLYSIDYL-HYDANTOIN ISOCYANATES
U.S. Pat. No. 3,846,442—GLYCIDYL HYDANTOIN COMPOUNDS
U.S. Pat. No. 3,449,353—N,N'-DIGLYCIDYL HYDANTOINS
U.S. Pat. No. 3,542,803—N,N'-DIGLYCIDYL COMPOUNDS
U.S. Pat. No. 3,592,823—N,N'-DIGLYCIDYL COMPOUNDS
U.S. Pat. No. 3,620,983—β-METHYLGLYCIDYL-ISOCYANURATES
U.S. Pat. No. 3,679,681—DIGLYCIDYL ETHERS
U.S. Pat. No. 3,726,895—DIGLYCIDYL DERIVATIVES OR COMPOUNDS CONTAINING TWO N-HETEROCYCLIC RINGS
U.S. Pat. No. 3,772,326—DIGLYCIDYL COMPOUNDS OF MONOHYDROXALKYL HYDANTOINS
U.S. Pat. No. 3,778,439—BINUCLEAR N-HETEROCYCLIC POLYCLYCIDYL COMPOUNDS
U.S. Pat. No. 3,780,057—PYRAZOLONE PIGMENTS
U.S. Pat. No. 3,787,405—DIGLYCIDYL COMPOUNDS CONTAINING A N-DETEROCYCLIC RING
U.S. Pat. No. 3,808,226—POLYACRYLATES OF N-HETEROCYCLIC COMPOUNDS
U.S. Pat. No. 3,809,660—EPOXIDE RESIN MIXTURES OF HETEROCYCLIC N,N'-DIGLYCIDYL COMPOUNTS
U.S. Pat. No. 3,809,696—DIGLYCIDYL COMPOUNDS CONTAINING TWO N-HETEROCYCLIC RINGS
U.S. Pat. No. 3,821,242—DIGLYCIDYL ETHERS
U.S. Pat. No. 3,821,243—HETEROCYCLIC TRIGLYCIDYL COMPOUNDS
U.S. Pat. No. 3,828,045—DIGLYCIDYL ETHERS OF FIVE AND SIX MEMBERED N-HETEROCYCLIC COMPOUNDS
U.S. Pat. No. 3,828,066—DIGLYCIDYLIMIDAZOLIDONES
U.S. Pat. No. 3,843,675—N-HETEROCYCLIC POLYGLYCIDYL COMPOUNDS CONTAINING ESTER GROUPS
U.S. Pat. No. 3,864,358—EPOXY-ACRYLIC ACID ESTERS all of which are hereby incorporated by reference.

Preferred classes of compounds are:

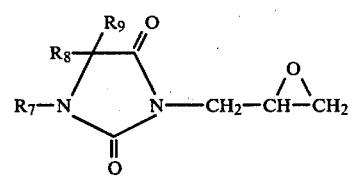

I wherein $R_7$ is hydrogen or

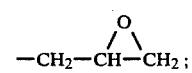

$R_8$ and $R_9$ are independently selected from the group hydrogen, alkyl of 1 to 5 carbon atoms, phenyl, a saturated aliphatic ring of 5 to 7 carbon atoms or together form a 5 to 7 member saturated carbocyclic ring; or

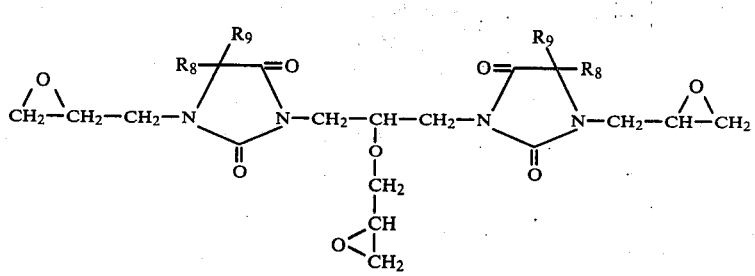

Regardless of the manner of introducing the oxirane ring into the coating resin, the amine reactant shown in reaction No. 2 is used in an amount such that all oxirane rings are reacted and that the coating composition as used in the electrodeposition process has no oxirane rings.

In curing the coating composition of the present invention, it has been found highly desirable that nitrogenous containing cross-linking agents be employed in an effective curing amount. Generally the amount of nitrogen containing material that is employed is sufficient to react with some or all of the hydroxyl groups present on the polymeric material or the number of hydroxyl groups present on Formula A contained in the polymeric material. If desired, the amount of fatty acid containing unsaturation may be increased to produce an air dried composition.

When a cross-linking agent is employed, it is preferred that a blocked isocyanate or a melamine type containing composition be used as the cross-linking agent. Other cross-linking agents may also be used such as urea formaldehyde, phenol formaldehyde, benzoguanamine, amideimide, polyamide, polybenzimidazole, and the like.

Suitable isocyanates that may be used in the present invention are as follows:

propylene-1,2-diisocyanate,
butylene-1,2-diisocyanate,
butylene-1,3-diisocyanate,
hexamethylene diisocyanate,
octamethylene diisocyanate,
nonamethylene diisocyanate,
decamethylene diisocyanate,
2,11-diisocyano-dodecane and the like,
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanate, such as methylpropylbenzene diisocyanate, methylethylbenzene diisocyanate, and the like,
2-2'-biphenylene diisocyanate,
3,3'-biphenylene diisocyanate,
4,4'-biphenylene diisocyanate,
3,3'-dimethyl-4,4'-biphenylene diisocyanate, and the like,
methylene-bis-(4-phenyl isocyanate),
ethylene-bis-(4-phenyl isocyanate),
isopropylidene-bis-(4-phenyl isocyanate),
butylene-bis-(4-phenyl isocyanate),
hexafluoroisopropylidene-bis-(4-phenyl isocyanate), and the like,
2,2'-oxydiphenyl diisocyanate,
3,3'-oxydiphenyl diisocyanate,
4,4'-oxydiphenyl diisocyanate, and the like,
2,2'-ketodiphenyl diisocyanate,
3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate, and the like,
2,2'-sulfonediphenyl diisocyanate,
3,3'-sulfonediphenyl diisocyanate,
4,4'-sulfonediphenyl diisocyanate, and the like,
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-cyclohexyl isocyanate),
bis-(para-isocyano-cyclohexyl) sulfide,
bis-(para-isocyano-cyclohexyl) sulfone,
bis-(para-isocyano-cyclohexyl) ether,
bis-(para-isocyano-cyclohexyl) diethyl silane,
bis-(para-isocyano-cyclohexyl) diphenyl silane,
bis-(para-isocyano-cyclohexyl) ethyl phosphine oxide,
bis-(para-isocyano-cyclohexyl) phenyl phosphine oxide,
bis-(para-isocyano-cyclohexyl) N-phenyl amine,
bis-(para-isocyano-cyclohexyl) N-methyl amine, 2,6-diisocyano-pyridine,
bis-(4-isocyano-phenyl) diethyl silane,
bis-(4-isocyano-phenyl) diphenyl silane,
dichloro-biphenylene diisocyanate, bis-(4-isocyanophenyl) ethyl phosphine oxide,
bis-(4-isocyano-phenyl) phenyl phosphine oxide,
bis-(4-isocyano-phenyl)-N-phenyl amine,
bis-(4-isocyano-phenyl)-N-methyl amine,
3,3'-dimethyl-4,4'-diisocyano biphenyl,
3,3'-dimethoxy-biphenylene diisocyanate,
2,4-bis-($\beta$-isocyano-t-butyl) toluene,
bis-(para-$\beta$-isocyano-t-butyl-phenyl) ether,
para-bis-(2-methyl-4-isocyano-phenyl) benzene,
para-bis-(1,1-dimethyl-5-amino-pentyl)benzene,
3,3'-diisocyano adamantane,
3,3'-diisocyano biadamantane,
3,3''-diisocyanoethyl-1,1'-biadamantane,
1,2-bis-(3-isocyano-propoxy) ethane,
1,2-dimethyl propylene diisocyanate,
3-methoxy-hexamethylene diisocyanate,
2,5-dimethyl heptamethylene diisocyanate,
5-methyl-nonamethylene diisocyanate,
1,4-diisocyano-cyclohexane,
1,2-diisocyano-octadecane,
2,5-diisocyano-1,3,4-oxadiazole,
$OCN(CH_2)_3O(CH_2)_2O(CH_2)_3NCO$,
$OCN(CH_2)_3S(CH_2)_3NCO$,
$OCN(CH_2)_3N(CH_2)_3NCO$,
polymethylene polyphenyl isocyanate;

biurets of the formula

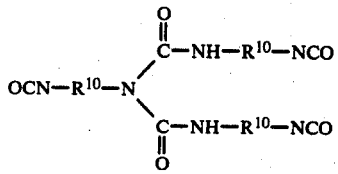

where $R^{10}$ is an alkylene group having 1–6 carbon atoms, especially preferred is the biuret of hexamethylene diisocyanate;

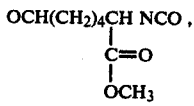

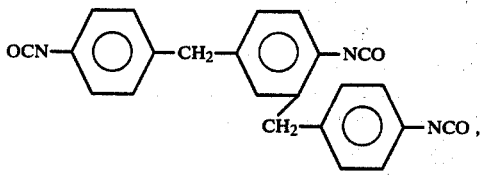

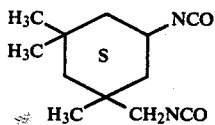

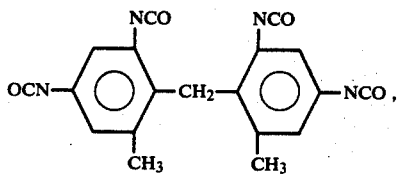

A number of blocking agents may also be used to produce a blocked isocyanate which could be used as the cross-linking agent. Such blocking agents as the phenol type, lactone type, active methylene type, alcohol type, mercaptan type, acid amide type, the imide, the amine type, the urea type, carbamate type, oxime type, sulfate type and the like. Most preferrably a ketoxime type is preferred, and even more preferrably a dialkyl ketoxime of from 1 to 4 carbon atoms per alkyl group. Most preferably the ketoxime would be methylethyl ketoxime, methyl-isobutyl ketoxime, and the like.

Suitable melamine type cross-linking agents are hexamethoxymethyl melamine, alkylated (melamine-formaldehyde), butylated melamines, and the like.

The coating compositions of the present invention are useful in the cathodic electrodeposition of substrates. Generally the bath pH ranges from about 3–9. The substrate may be any conductive substrate, preferably iron, zinc or aluminum containing substrates such as steel, with or without protective coatings, such as phosphate corrosion resistant coatings. Most preferably the coatings of the present invention are applied to metallic substrates, such as steel.

In the electrodeposition process, the conductive metallic substrate would be the cathode in the electrical process and an anode would be placed in the electrodeposition bath, with the electrodeposition coating of the present invention being incorporated in the aqueous electrolyte between the anode and the cathode. The electrodeposition process is one that would be conducted at a temperature ranging from about 50° F. to 150° F., preferably room temperature. The voltage may vary greatly, although normally it will operate between 50 and 500 volts. The current density ranges from about 1 amp to about 15 amps per square foot.

The nitrogen containing coating compositions of the present invention are solubilized, dispersed or suspended by means of an acid, such as an organic acid, such as acetic acid, lactic acid, citric acid and the like, although any water solubilizing agent may be used as boric or hydrochloric acid, etc.

As has been mentioned above, if a high concentration of unsaturated fatty acids are employed, the composition may be air cured. Preferrably, however, the coating compositions are cured by means of subjecting the coated substrate to a high temperature or a bank of infrared lamps having a temperature ranging from about 250° F. (121° C.) to about 500° F. (260° C.), preferrably between about 300° F. (149° C.) and about 390° F. (199° C.) from a time ranging from about 1 minute to 1 hour, preferably 10 minutes to 45 minutes.

It is to be appreciated that a curing catalyst may also be added to the coating composition, such as tin compounds as dibutyl tin dilaurate, dibutyl tin diacetate, dibutyl tin oxide, metallic dryers as cobalt and zirconium, naphthenate or octoate.

When a blocked isocyanate is employed as described above, it is to be appreciated that the blocking agent will decompose at temperatures greater than 50° C. which will permit the remaining isocyanate moiety to react with the film forming composition. At less than about 50° C., the blocked isocyanate is substantially stable and is nonreactive with the hydroxyl groups present on the acrylic polymer, or the hydroxyl groups present on Formula A moiety.

In known manner, catalysts, pigments, anti-oxidants, surfactants or fillers may be added to the coating composition to improve the appearance, texture, gloss and other properties of the cured film. Pigments such as carbon black, titanium dioxide, metal oxides, chromates, sulfate and the like may be used.

The components of the coating composition (on a pigment, filler and catalyst free basis) of the present invention are generally present as follows:

| Resin | Range | Preferred |
|---|---|---|
| Monomer (total) | about 30 to about 60 | 49 |
| acrylic portion | about 10 to about 40 | 20 |
| Fatty acid ester | about 30 to about 50 | 36 |
| Formula A producing amine | balance | 15 |
| TOTAL (parts by weight) | 100 | 100 |
| Cross-linking Agent | about 10 to about 50 | about 20 to about 30 |
| TOTAL (resin + cross-linking agent) (parts by weight) | 100 | 100 |

Having described the invention in general, listed below are embodiments wherein all parts are in parts by weight and all temperatures in degrees centigrade, unless otherwise indicated.

EXAMPLE NO. 1

Into a beaker equipped with a thermometer, stirrer and reflux condenser was placed dehydrated castor oil fatty acid (contains 30% conjugated double bonds; 329.4 parts), n-butyl glycidyl ether (132.6 parts) and zirconium octoate (0.5 parts) and heated under a nitrogen environment to 150° and allowed to exotherm. The heat was held at 190° until an acid number of about 33. Then LSU 549 (trademark of Ciba Geigy for a product of the structure

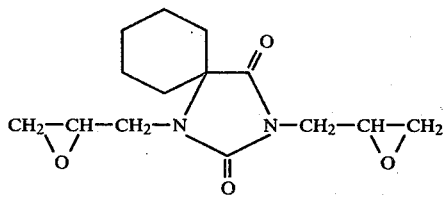

having a melting point of 90°–95° C. and an epoxy equivalent (Kg of 6.8; 55.9 parts) was added and temperature held to an acid number of zero was reached. The mixture was cooled to 165° C. and over 1¾ hours was added styrene (413 parts), glycidyl methacrylate (GMA) (287 parts) and dicumene peroxide catalyst (31 parts) and then heated for an additional hour at 180°. The solution was cooked to 140° and di-tert-butyl peroxide (2.7 parts) was added. The product was held to 96% theoretical solids content, cooled to 95° and diethanolamine (202 parts) added. The mixture exothermed to 120° and temperature held there for one hour. Thereafter n-butanol was added (254 parts). The product had an amine value of 75.3 and a viscosity (25° C.; 50% theoretical solids in n-butanol) of P (hereinafter product A).

A coating composition was formulated from the above product as follows:

Into a pebble mill was added carbon black (8 parts), product A (40 parts) and n-butanol (32 parts) and ground for 40 hours until carbon black is dispersed and has a Hegman reading of 7+. (hereinafter product B - pigment dispersion). Product A (311.3 parts), Cymel 1116 (trademark of American Cyanamid for a melamine cross-linking agent) - (71.8 parts) and zirconium octoate (1.8 parts) was placed in a Cowles mixer and mixed with barytes (40 parts) to a reading of Hegman 7+. Thereafter product B (80 parts) and acetic acid (12.3 parts) was mixed with product A and the cross-linking agent and emulsified with deionized water until an inversion occurs.

A zinc phosphate treated panel was used as a cathode and a carbon anode with the coating composition described above (10% solids) as the electrolyte. The voltage employed was 200 volts with the coating thickness on the cathode ranging from 0.50–0.65 mils. The panel was washed and baked at a temperature of 400° F. for 20 minutes. Smooth glossy films with good adherence to the metal substrates were obtained with satisfactory salt spray (5% sodium chloride in water) results. (Scribe pull of 2–6 mm. after 276 hours)

EXAMPLE NO. 2

Into a beaker equipped with a stirrer, thermometer and a reflux condenser was placed Pamolyn 380 (trademark of Hercules for a conjugated fatty acid being characterized as containing 70% conjugated unsaturation of linoleic acid, an acid number of 197, an iodine value of 102 and an oleic acid content of 22%; 224 parts; 0.8 equivalents); n-butanol (59 parts; 0.8 equivalents). The mixture was heated under a nitrogen blanket to a temperature of 130° for about 6 hours, removing water to produce an acid number of zero to produce the butyl ester of Pamolyn 380.

In a separate equivalently equipped beaker was placed butyl ester of Pamolyn 380 (517.9 parts) and heated to 165° C. Over a one-hour-and-forty-five-minute period was added styrene (413 parts), GMA (287 parts) and dicumene peroxide (31 parts). Thereafter the mixture was heated at about 180° C. for another hour. The mixture was cooled to 140° C., and di-tert-butyl peroxide (2.7 parts) was added and mixture held for less than an hour at same temperature until theoretical solids reached 96%. The mixture was cooled to 95° and diethanol amine (202 parts) was added, the temperature heated to 125° C. for 2 hours. Thereafter n-butanol (254 parts) was added. The product had an amine value of 90.9 and a viscosity of m (25° C. in 50% theoretical solids in n-butanol).

What is claimed is:

1. An organic coating composition comprising a dispersion, solution or suspension of a coating composition characterized by:
   (a) the reaction product of a conjugated fatty acid ester and an acrylic containing monomer; and
   (b) Formula A within the molecule, being the reaction product of reacting an amine with an oxirane ring;
   wherein Formula A is:

$$-CH_2-C(Z)-CH_2-N>$$

wherein Z is independently selected from the group consisting of hydrogen, hydroxyl, alkoxy of from one to 6 carbon atoms; acyloxy of from one to 6 carbon atoms; (=O), $+OR'\!\!\!\!]_nH$, $+OR'\!\!\!\!]_nOH$, and $+OR'(CH_2OH)\!\!\!\!]_nOH$; wherein R' is a saturated alkylene of from 2 to 4 carbon atoms and n is a number from 1 to 6.

2. Composition of claim 1 wherein the fatty acid ester is obtained by the reaction between a fatty acid and an alkanol of from 1 to 12 carbon atoms.

3. The composition of claim 1 wherein the composition is substantially free of oxirane rings.

4. The composition of claim 1 further comprising an effective amount of a nitrogenous cross-linking composition.

5. The composition of claim 1 wherein the coating composition is comprised of a resin portion characterized as follows:

| Components | Parts by Weight |
|---|---|
| a) total monomer portion used to produce polymer | about 30 to about 60 |
| b) fatty acid ester portion | about 30 to about 50 |
| c) Formula A producing amine portion | balance | wherein the total resin components equals 100 parts (on a pigment, catalyst and filler free basis).

6. The composition of claim 5 wherein the acrylic monomer comprises about 10 to about 40% of the total resin portion of the coating composition.

7. The composition of claim 1 wherein Z is hydroxyl.

* * * * *

UNITED STATES PATENT OFFICE
CERTIFICATE OF CORRECTION

Patent No. 4,186,117    Dated January 29, 1980

Inventor(s) Ivan H. Tsou

It is certified that error appears in the above-identified patent and that said Letters Patent are hereby corrected as shown below:

In Column 12, line 35, formula "$-CH_2-C(Z)-CH_2-N>$"

should read --- $-CH_2-C(Z)-CH_2-N{<}$ ---.

Signed and Sealed this

Seventeenth Day of June 1980

[SEAL]

Attest:

SIDNEY A. DIAMOND

*Attesting Officer*    *Commissioner of Patents and Trademarks*